United States Patent [19]
Feldhaus et al.

[11] Patent Number: 5,249,660
[45] Date of Patent: Oct. 5, 1993

[54] CLUTCH DISC FOR A MOTOR VEHICLE FRICTION CLUTCH

[75] Inventors: Reinhard Feldhaus, Ebenhausen; Matthias Fischer, Eltingshausen; Harald Jeppe, Schweinfurt, all of Fed. Rep. of Germany

[73] Assignee: Fichtel & Sachs AG, Schweinfurt, Fed. Rep. of Germany

[21] Appl. No.: 846,677

[22] Filed: Mar. 5, 1992

[30] Foreign Application Priority Data

Mar. 6, 1991 [DE] Fed. Rep. of Germany ....... 4107125

[51] Int. Cl.⁵ .................. F16D 13/64; F16D 3/14; F16D 3/66
[52] U.S. Cl. .................... 192/106.2; 464/68
[58] Field of Search .................. 192/106.2, 106.1; 464/66, 68

[56] References Cited

U.S. PATENT DOCUMENTS

| | | | |
|---|---|---|---|
| 4,549,641 | 10/1985 | Ootani et al. | 192/106.2 |
| 4,700,822 | 10/1987 | Maucher et al. | 192/106.2 |
| 4,715,485 | 12/1987 | Rostin et al. | 192/106.2 |
| 4,848,552 | 7/1989 | Nishimura et al. | 192/106.2 |
| 4,883,156 | 11/1989 | Rohne et al. | 192/106.2 |
| 4,890,712 | 1/1990 | Maucher et al. | 192/106.2 |
| 4,899,862 | 2/1990 | Graton et al. | 192/106.2 |
| 4,998,608 | 3/1991 | Raab et al. | 192/106.2 |
| 5,014,842 | 5/1991 | Graton et al. | 192/106.2 |
| 5,016,744 | 5/1991 | Fischer et al. | 192/106.2 |
| 5,025,904 | 6/1991 | Graton et al. | 192/106.2 |
| 5,064,041 | 11/1991 | Graton et al. | 192/106.2 |
| 5,117,959 | 6/1992 | Graton | 192/106.2 |

FOREIGN PATENT DOCUMENTS

| | | | |
|---|---|---|---|
| 463941 | 1/1992 | European Pat. Off. | 464/66 |
| 3412908 | 10/1984 | Fed. Rep. of Germany | 192/106.1 |
| 3616163 | 11/1986 | Fed. Rep. of Germany | |
| 63-9729 | 1/1988 | Japan | 192/106.2 |
| 1-79425 | 3/1989 | Japan | 192/106.2 |
| 2184812 | 7/1987 | United Kingdom | 192/106.2 |

Primary Examiner—Richard M. Lorence
Attorney, Agent, or Firm—Anderson Kill Olick & Oshinsky

[57] ABSTRACT

The clutch disc for a motor vehicle friction clutch comprises a hub (1) on which side discs (7, 9) are rotatably mounted, arranged axially spaced, rigidly joined together, carrying the clutch linings (17). A hub plate (19) joined with the hub (1) solid in rotation, but with rotary play, is coupled rotationally elastically by means of springs (23) with the side discs (7, 9). Mounted axially between the hub plate (19) and one of the side discs (7) is a friction ring (41) of plastic material from which there protrude lugs (39) engaging into recesses (61) of the side disc (7). The lugs (39) guide the friction ring (41) solid in rotation but axially movable on the lateral disc (7). Axially mounted between the frictional ring (41) in frictional contact with the hub plate (19) and the side disc (7) is a disc spring (43) which applies with a plurality of flexible tongues protruding from its inner circumference on the friction ring (41). The flexible tongues engage in recesses of the friction ring (41). The friction ring carries on its inner circumference radially springing clamps (63) over which, together with the disc spring (43) it can be mounted by snapping on the side disc (7) or on a constructional part connected with the side disc (7).

15 Claims, 8 Drawing Sheets

CLUTCH DISC FOR A MOTOR VEHICLE FRICTION CLUTCH

BACKGROUND OF THE INVENTION

The invention relates to a clutch disc for a motor vehicle friction clutch and in particular to a clutch with a rotary oscillation damper with which a friction device is associated.

From DE-A-36 16 163 (corresponding to U.S. Pat. Nos. 4,700,822 and 4,890,712) a clutch disc for a motor vehicle friction clutch is known, on the hub of which to be connected with the gear input shaft two lateral discs, mounted axially with a space between them and rigidly connected together by rivets, forming part of a load oscillation damper designed for on-load operation, are rotatably mounted. Mounted axially between the two lateral discs, of which one carries at the same time the clutch friction linings, is a hub disc which is connected with the hub by means of toothing with limited rotational play, yet rigid in rotation. For on-load operation suitable loading springs connect the lateral discs forming the input part of the load damper rotationally-elastically with the hub disc forming the output part of the load damper. Accommodated axially between one of the two lateral discs and the hub disc is an idling rotational oscillation damper suitable for idle no-load operation, the input part of which is connected solid in rotation with the hub disc of the load rotational oscillation damper, and the output part of which lies solid in rotation on the hub. For no-load operation appropriate springs connect rotationally elastically together the input part and the output part of the no-load rotational oscillation damper.

The input part of the no-load rotational oscillation damper is constructed as a multipart plastic moulding and has a friction surface by means of which it applies on the one lateral disc. Between the other lateral disc of the on-load rotational oscillation damper and the hub disc a leaf spring is mounted which presses the friction surface of the input part of the no-load damper against the one lateral disc, so that in this way a friction device suited to on-load operation is obtained.

The invention is directed to providing a clutch disc with a torsional oscillation damper designed particularly for on-load operation, the friction device of which is of simple construction, easy to fit as well as particularly reliable in operation.

SUMMARY OF THE INVENTION

The invention is based upon a clutch disc for a motor vehicle friction clutch comprising the following components:

a hub which defines a rotational axis;

a torsional oscillation damper with an input part and an output part rotatable around the rotational axis relative to the input part and connected with the hub in torque-transmitting manner, a first one of said parts being provided with a first disc part, a second one of said parts being provided with two second discs arranged axially on both sides of the first disc part and being rigidly connected together, and a plurality of springs coupling the input part rotationally elastically with the output part, the springs being mounted in windows of the first disc part and engaging in windows of the second disc parts;

a friction device having a friction ring mounted axially between the first and one of the second disc parts, said friction ring bearing by means of a friction surface on the first disc part and having, engaging axially into openings of said one of the two second disc parts, lugs which drive the friction ring solid in rotation but axially movably on one of the two second disc parts, and having a disc spring tensioning the friction ring axially resiliently against the first disc part;

clutch friction linings held on the input part.

In such a clutch disc it is provided according to the invention that the disc spring is mounted axially between said one of the two second disc parts and the friction ring and has, protruding approximately radially from its annularly closed spring body flexible tongues which apply with their ends on the friction ring, while the spring body applies with its edge radially facing away from the flexible tongues on said one of the two disc parts, and that each lug of the friction ring extends through a space between a pair of adjacent flexible tongues. The mounting of the disc spring between the said disc part and the friction ring permits a simple and reliable assembly, as the disc spring can be placed on the friction ring before the mounting of the latter and can be fixed there in defined manner. In addition, the disc spring and the friction ring require only a relatively small radial constructional space as they overlap in the radial direction.

The number of flexible tongues is appropriately an even-numbered multiple of the number of lugs, while, preferably, on the one hand the flexible tongues with respect to one another, and on the other hand the lugs with respect to one another have respectively the same angular distances between them to provide for an even axial introduction of force.

The friction ring has an annular body forming the friction surface, while the lugs preferably have a smaller radial extent than the annular body and are mounted approximately at the centre of the radial extension of the annular body. By this means it is achieved that, on the one hand, the flexible tongues engage centrally on the annular body, and on the other hand the spring body of the disc spring protrudes only slightly radially above the friction ring.

To reduce the wear between the flexible tongues and the friction ring in the peripheral direction, the friction ring has on its side, axially facing away from the friction surface, of its annular body forming the friction surface, recesses spaced at intervals in the peripheral direction, into which the flexible tongues engage. The edges of the recesses disposed in the circumferential direction receive in this arrangement the flexible tongues substantially without play between them in the peripheral direction. In particular, when the edges of the recesses extend at least in the region of the ends of the flexible tongues parallel with the defining edges of the flexible tongues situated on them, it is ensured that the flexible tongues in the peripheral direction cannot engage into the material of the lugs when, on rotary oscillations, the disc spring, through its inertia, exerts a torque on the friction ring.

The recesses in the friction ring can be radially defined, however, they extend appropriately over the entire radial height of the annular body of the friction ring in the form of radial grooves.

The defining edges of each individual flexible tongue extend in a preferred embodiment to an acute angle with respect to each other, while the defining edges of two adjacent flexible tongues opposing one another in the peripheral direction extend parallel with one another. In this manner, the lugs of the friction ring may be constructed as relatively solid rectangular units.

In a further preferred embodiment the friction ring has, distributed on its inner circumference, several axially protruding resilient clamps or locking arms which extend through openings of one of the two second disc parts, and engage from below with an axial stopping edge, formed on their ends remote from the friction surface, a defining edge of one of the two second disc parts or of a constructional part set into one of the second disc parts. The clamps make it possible to mount beforehand the disc spring on the friction ring on the second disc part, which facilitates the assembly of the remaining components of the clutch disc. The axial distance of the stopping edge of the clamp from the frictional surface is here appropriately greater than the axial distance of the defining edges from the friction surface, in order also further to operational wear to ensure a reliable application of the friction ring on the first disc part.

A further simplification of assembly is obtained if each clamp has on its end spaced from the friction surface a threading bevel which lifts the stopping edge over the defining edge on the axial insertion of the friction ring during assembly. Even when a plurality of clamps are provided, the friction ring, accordingly, must be inserted only axially, possibly against the force of the disc spring, onto the second disc part.

In principle, the clamps provided on the friction ring for locking engagement may be deflected either radially or also in the peripheral direction. Radially springing clamps, however, are preferred as they provide at the same time for a centering of the friction ring on the disc part. For a better utilization of the constructional space the lugs and the clamps are appropriately mutually offset in the peripheral direction.

Specially preferred are radially springing clamps with stopping edge protruding radially inwards if, inserted into a central opening of the said one of the two second disc parts, a guide ring is provided, rigidly axially secured, forming a defining edge. The guide ring guides the two rigidly mutually joined second disc parts radially on the hub and thus has a double role in that, on the one hand, it guides one on the other the input part and the output part of the rotary oscillation damper, and on the other hand, it secures axially the friction ring and the disc spring during assembly.

In an appropriate embodiment the guide ring, in the region of its outer periphery, has a L-shaped cross-sectional form which is produced by a shell surface engaging into the central opening and a radially protruding flange applying on the inner surface of the second disc part. In front of the flange, further clamps or locking arms are distributed in the peripheral direction and offset against the clamps; they are designed to be flexible in the peripheral direction and to engage pairwise through the openings associated with the lugs in the second disc part, as well as to engage from the rear, by means of the holding edges provided on their ends the second disc part at its external furface. In this manner the guide ring per se is radially guided in the simply produceable opening of the second disc part and axially held by the clamps. Threading bevels on the ends of the further clamps provide for the possibility of snapping the guide ring during assembly without any problems onto the second disc part. The axial distance of the holding edge of every further clamp from the flange is, for the axial play-free securing of the guide ring, chosen to be identical with the thickness of the second disc part.

With respect to the friction ring this is preferably chosen to be an integral plastic moulding. Preferably, the invention is applied in the case of those clutch discs in which a rotary oscillation damper appropriate for idling or no-load operation is mounted on the side of the first disc part facing away axially from the friction disc axially between the first disc part and the other of the two second disc parts, and indeed in such a manner that the supporting force path of the disc spring closes over the no-load operation oscillation damper. In this connection the preference is given to constructions in which also at least the components of the no-load oscillation damper are made of plastic material, so that they can also be used for the production of frictional force of the load frictional device.

The various features of novelty which characterise the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Hereinbelow the invention will be explained on the basis of a drawing, in greater detail. In the drawings.

DESCRIPTION OF PREFERRED EMBODIMENTS

Figure 1:
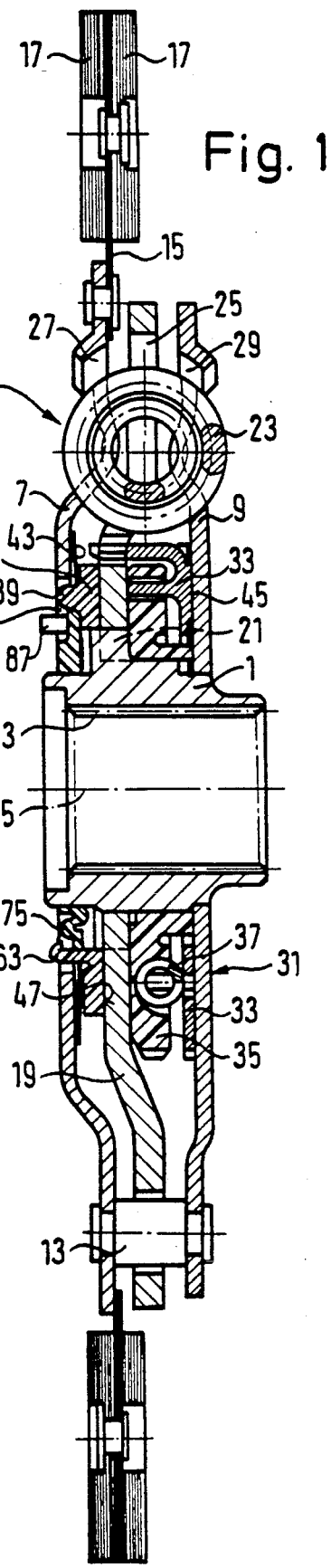
FIG. 1 is an axial longitudinal section through an embodiment of a clutch disc according to the invention.

FIG. 1 shows the overall construction of a clutch disc of the invention. The clutch disc includes a hub 1 with an inner toothing 3 by means of which the hub 1 can be coupled solid in rotation, but axially movable, with a gear input shaft not represented. The gear shaft and all individual parts of the clutch disc are concentrically mounted about a rotating axis 5. Rotatably mounted on the hub 1 are lateral discs 7, 9 of a load torsional oscillation damper 11 designed for on-load operation. The lateral discs 7, 9 axially spaced from one another are rigidly joined together by distance rivets 13. Clutch friction linings 17 are secured to the lateral disc 7 by means of a driver plate 15. Mounted axially between the lateral discs 7, 9 is a hub plate 19 which is coupled by means of a toothing 21 on its inner periphery with the hub 1, solid in rotation, but with a predetermined rotary play. The load damper 11 comprises several helical springs 23 designed for on-load operation, distributed in the peripheral direction, which connect the lateral discs 7, 9 rotationally elastically with the hub plate 19. FIG. 1 shows only one of the springs 23 which are respectively situated in a window 25 of the hub plate 19 and windows 27, 29 of the lateral discs 7, 9 and aligned axially on them.

The clutch disc comprises in the constructional space, on the one hand radially between the hub 1 and the mounting region of the loading springs 23, and on the other hand axially between the hub plate 19 and the lateral disc 9, a no-load operation torsional oscillation damper 31 designed for no-load or idling operation, the input part 33 of which is coupled solid in rotation with the hub plate 19 and the output part 35 of which is held solid in rotation on the hub 1 by means of toothing. For the no-load operation designed helical springs 37 couple the input part 33 rotationally elastically with the output part 35. The no-load operation damper 31 is in this arrangement active inside the rotational play of the toothing 21 on a relative rotation of the hub plate 19 relative to the hub 1.

On the side of the hub plate 19 axially facing away from the on-load operation damper 31, and axially between the hub plate 19 and the lateral disc 7, there is provided a friction ring 41 connected solid in rotation but axially movable with the lateral disc 7 by means of several axially protruding lugs 39 distributed in the peripheral direction; this friction ring is tensioned against the hub plate 19 by a disc spring 43 mounted between the friction ring 41 and the lateral disc 7. The hub plate 19 is, together with the input part 33, axially movable guided on the hub 1, so that the input part 33 is tensioned with a level friction surface 45 against the inner side of the lateral disc 9. The friction ring 41 has similarly a level friction surface 47 by means of which it lies on the surface of the hub plate 19 facing in the direction of the lateral disc 7. The friction ring 41 with its friction surface 47, and the input part 33 with its friction surface 45, together form with the disc spring 43 a frictional device suited for on-load operation which is effective in on-load operation on a relative rotation between the lateral discs 7, 9 and the hub plate 19.

Figure 2:
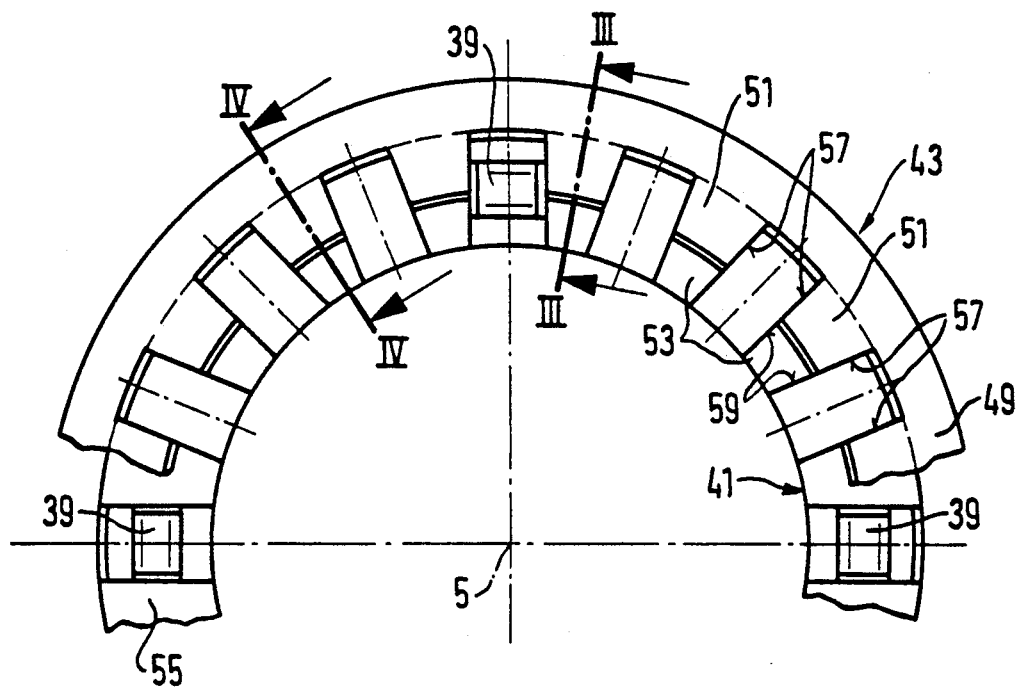
FIG. 2 is a detailed view of a friction ring, with disc spring positioned thereon, of a frictional device of the clutch disc.
Figure 3:
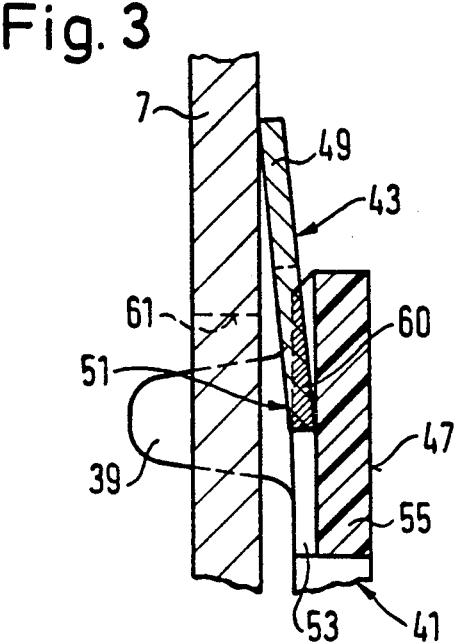
FIG. 3 is a sectional view through the friction device, seen along a line III—III in FIG. 2.
Figure 4:
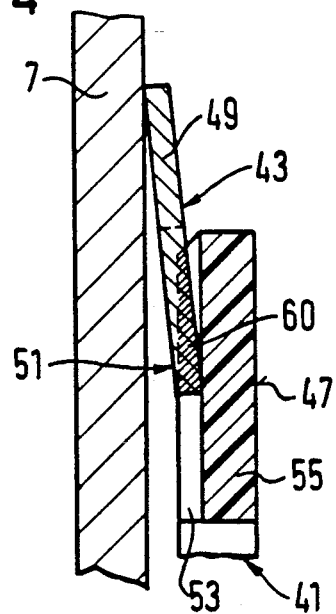
FIG. 4 is a sectional view through the friction device, seen along a line IV—IV in FIG. 2.

Hereinbelow the load frictional device will be described in greater detail. FIG. 2 shows in an axial top view the friction ring 41 and the disc spring 43. The disc spring 43 has an annular base element 49 from which, in the example of embodiment shown, a plurality of flexible tongues 51 evenly spaced protrude radially inwards. The flexible tongues engage into radial grooves of an annular base element 55 of the friction ring 41. The grooves 53 extend, as the friction surface 47 also does, substantially over the entire radial height of the base element 55, as best shown by the FIGS. 3 and 4. FIGS. 3 and 4 further show that flexible tongues 51 protruding radially inwards lie with their ends on the bottom of the grooves 53, while the spring element 49 bears with its outer circumference on the lateral disc 7. It will be understood that other methods of mounting are also possible, particularly such in which the flexible tongues protrude radially outwards from the spring body of the disc spring. As FIG. 2 shows, the flexible tongues 51 have radial sides 57 extending towards each other at an acute angle, said sides 57 engage in the peripheral direction substantially free from play parallel defining edges 59 of the grooves 53. The defining edges 57 of adjacent flexible tongues 51 oppositely placed in the peripheral direction extend parallel one with the other and form intermediate spaces through which the lugs 39 pass. As a consequence of the formation described of the flexible tongues 51 there arise comparatively wide intermediate spaces so that the lugs 39 may acquire the form of solid blocks rectangular when seen from above. The number of the flexible tongues 51 is an even numbered multiple of the lugs 39 also arranged spaced from each other at regular angular distances.

In the example of embodiment shown sixteen flexible tongues 51 are provided for four lugs 39. As a result of the evenly distributed arrangement of the lugs 39 and the flexible tongues 51, whereby the lugs 39 pass through intermediate spaces between the flexible tongues, the radial space requirement of the friction device is kept small and the force of the disc spring 43 is introduced centrally into the annular frictional surface 47. Last but not least there is achieved in this manner an application force distribution uniform in peripheral direction on the hub plate 19. As the flexible tongues 51 engage in recesses of the friction ring 41 made through the grooves 53, the support range between the disc spring 43 and the friction ring 41, when torsional oscillations and axial vibrations occur in operating, is less loaded and subjected to less wear. Particularly, in the peripheral direction there occur, as FIGS. 3 and 4 shown by means of hatched overlapping areas 60, substantial areas of engagement, as a result of which wear in this area is considerably reduced.

Figure 6:
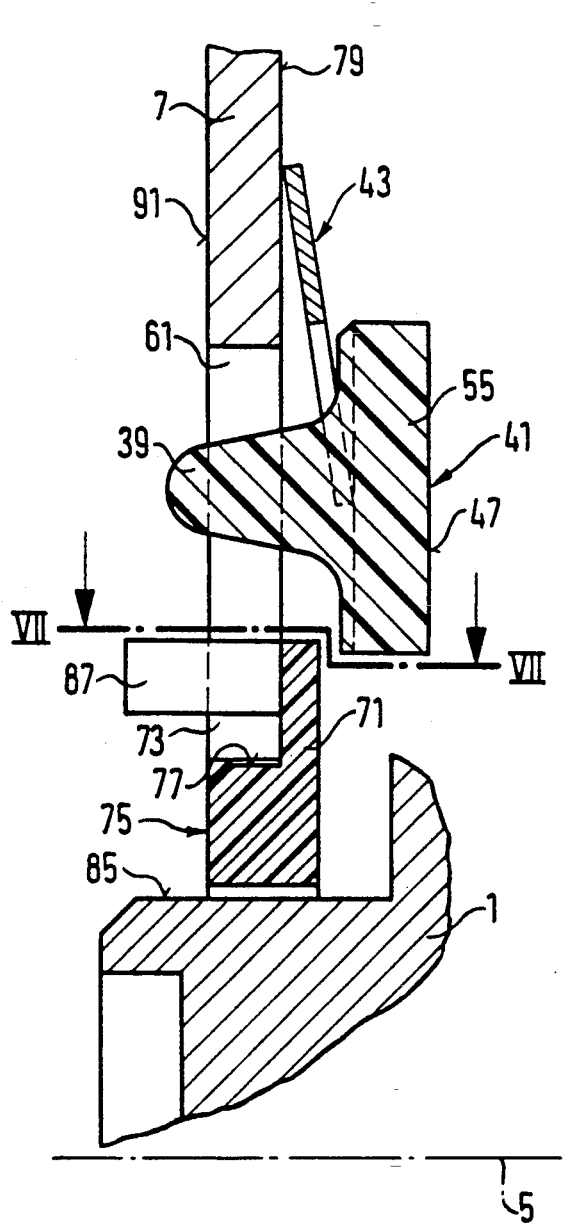

The lugs 39 which drive the friction ring 41 solid in rotation, yet movably on the lateral disc 7, engage, as shown in FIG. 1 and in greater detail in FIG. 6, into slit-shaped recesses 61 which are provided in the lateral disc 7. For the radial and axial fixing of the friction ring 41, there are formed, on its inner circumference in the peripheral direction axially protruding locking arms or clamps 63 offset relative to the lugs 39 which engage through associated recesses 65 of the lateral disc 7. The clamps 63 are designed to be radially resilient and carry on their free ends 67 facing away from the friction surface 47 radially protruding stop shoulders 69 axially directed towards the friction surface 47 which contact at the rear a flange 71, protruding in front of the recess 65, of a guide ring 75 rigidly inserted into a central opening 73 of the lateral disc 7. The guide ring 75 is made in a plastic material able to slide and has, in the region of its outer periphery, an L-shaped profile which, with a substantially peripheral area 77, is set in the central opening 73 and protrudes radially from the flange 71. The flange 71 engages the inner surface 79 of the lateral disc 7 and forms a peripheral surface 81 on which the clamps 63 guide the friction ring 41 radially. The flanges 71 engaging the inner surface 79 of the lateral disc 7 thus forms a defining edge which is contacted at the rear by the stop surface 69 of the clamp 63.

Figure 5:
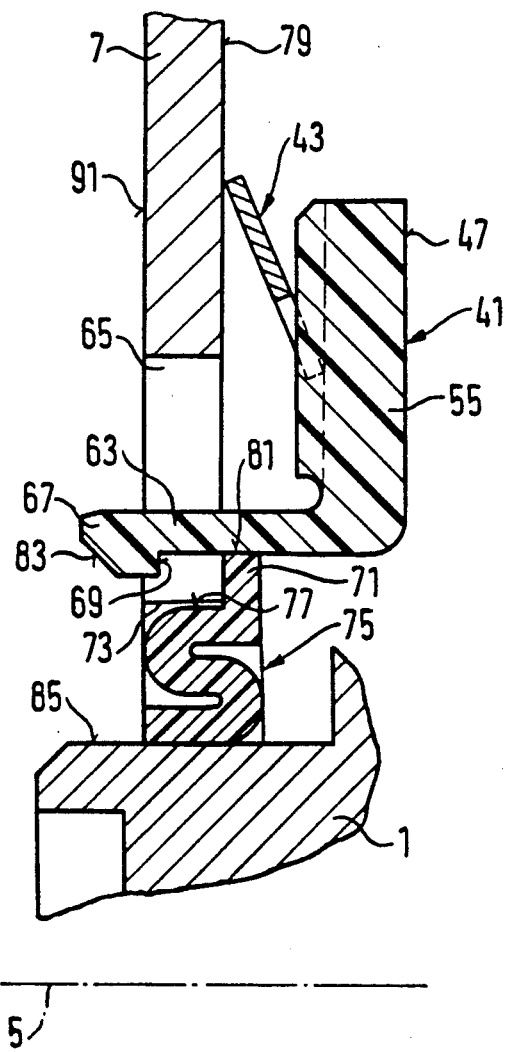
FIGS. 5 and 6 are detailed views of FIG. 1.

Provided on the free end 67 of the clamp 63 is a entry chamfer 83 rising radially inwards over which the clamp 63, during the fitting of the friction ring 41, can be snapped onto the flanges 71. The axial distance of the stop surface 69 from the friction surface 47 is chosen to be greater than the distance of the defining edge of the flange 71 from the friction surface 47 arising during the operation of the clutch disc. The friction ring 41 and the disc spring 43 can, on the assembly of the clutch disc, be premounted on the lateral disc 7 which simplifies the overall work of assembly of the clutch disc. The distance of the stop surface 69 from the friction surface 47 is in this arrangement determined in such a manner that the disc spring 43 is already held with lighter tension when the stop surfaces 69 of the premounted friction ring 41 engage the flange 71. When the assembly of the clutch disc is completed, the disc spring 43 is more extensively compressed and the stop surfaces 69, as shown in FIG. 5, are raised from the flange 71. The difference of distance is such that it is not compensated as a result of the operational wear of the friction ring 41.

Figure 7:
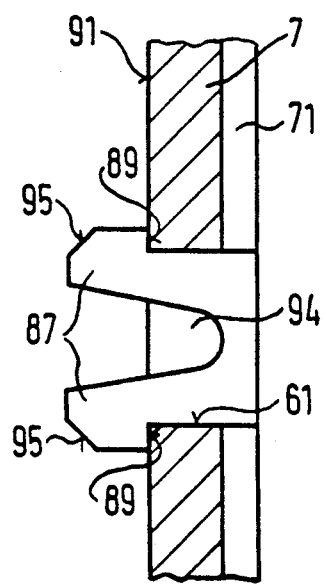
FIG. 7 is a partly sectional radial view of a guide ring, seen along a line VII—VII in FIG. 6.

FIGS. 6 and 7 show details of the securing of the guide ring 75, which sits rotatably on a cylinder shoulder 85, to the lateral disc 7. Protruding axially from the flange 71 of the guide ring 75 and offset in the peripheral direction are further locking arms or clamps 87 which pass pairwise through the recesses 61 of the lateral disc 7 associated with the lugs 39 of the friction ring 41 and contact in a close fit from the rear by means of axial stop surfaces 89 the outer side 91 of the lateral disc 7. The clamps 87 of each pair are separated one from the other by a slit 94 and are designed to be resilient in the peripheral direction. Whereas the stop surfaces 89 extend away from each other, entry chamfers 95 are formed tapering one on the other on the free ends of the clamps 87. The guide ring 75 can thus also be snapped onto the lateral disc 7.

Figure 8:
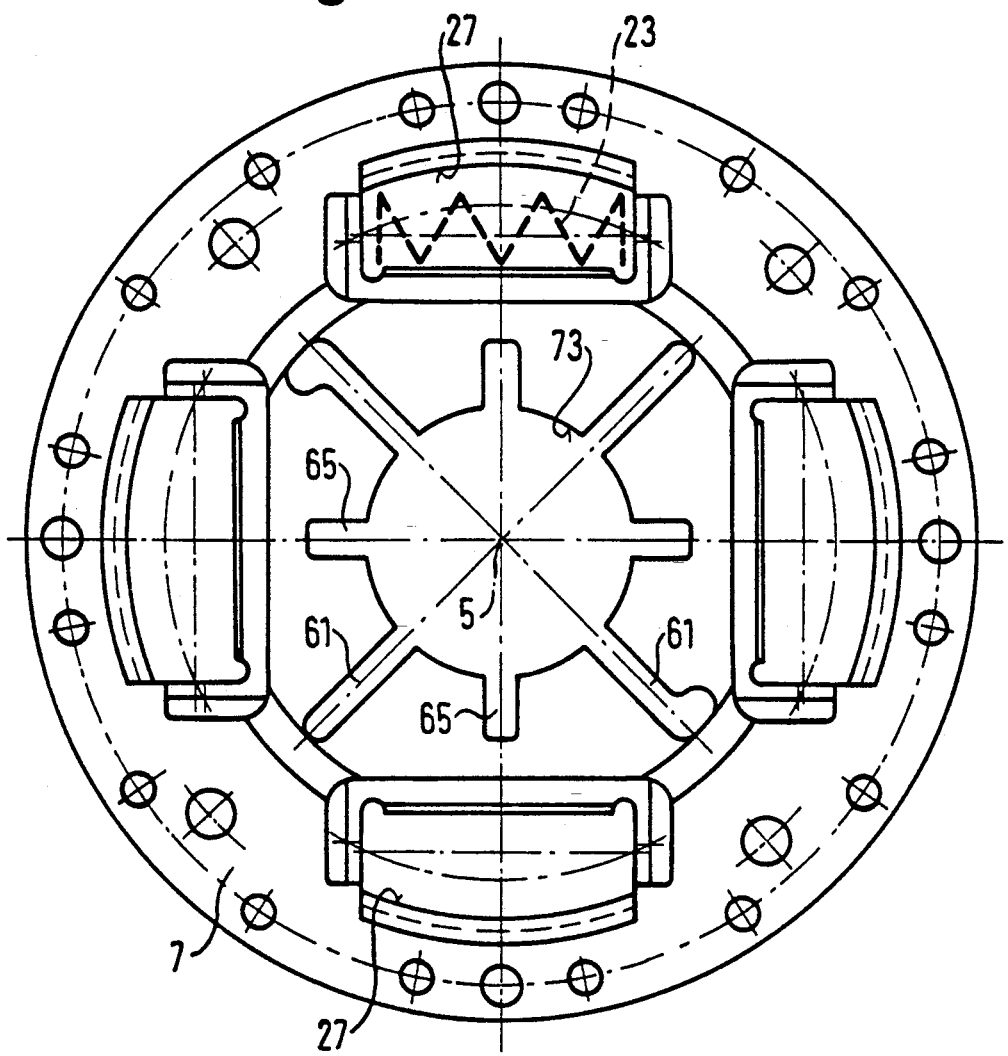
FIG. 8 is an axial view of a side disc of the clutch disc of FIG. 1.

FIG. 8 shows details of the lateral disc 7 and particularly the central opening 73 and the windows 27 of the springs 23. The recesses 61 provided to receive the lugs 39 and the clamps 87 are designed as slits extending radially from the central opening 73, the defining edges of which run parallel. The recesses 65 intended to receive the clamps 63 of the friction ring are also designed as slits extending radially from the opening 73 with parallel defining edges, the radial length of which, however, is shorter than that of the slits 61. Whereas the slits 61 lie in the peripheral direction between the windows 27, the slits 65 are situated in the central plane of the windows 27.

Figure 9:
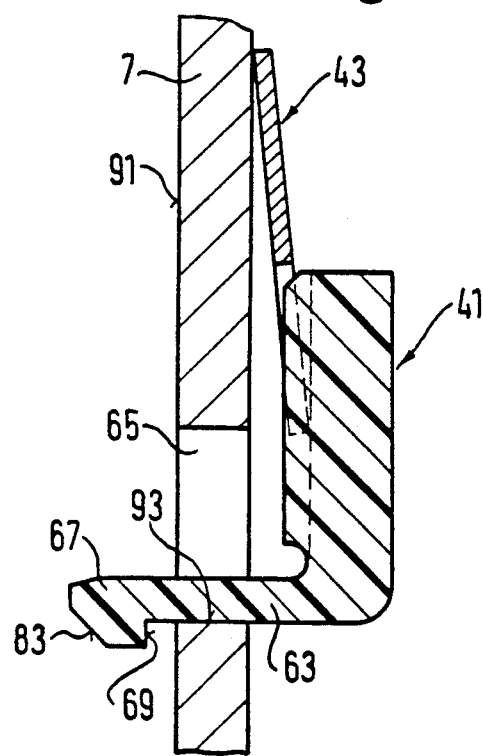
FIG. 9 is a detailed view of an alternative of the clutch disc.

FIG. 9 shows an alternative of the securing of the friction ring 41 which differs from the method of embodiment explained hereinabove only in that the recess 65 of the lateral disc 7 intended to receive the clamp 63 is closed radially inwards by a radial stop face 93 of the lateral disc 7, so that the radially springing clamp 63 engaging through the recess 65 for the friction ring 41 is radially guided on the stop face 93 instead of on the guide ring 75. The axial length of the clamp 63 is so calculated that its axial stop face directly engages from the rear the external lateral surface 91 of the lateral disc 7 directly.

The disc spring 43 and the friction ring 41 can thus again, as already explained, be premounted on the lateral disc 7. The friction ring 41 moreover corresponds to the friction ring explained on the basis of FIGS. 1 to 8.

While specific embodiments of the invention have been shown and described in detail to illustrate the application of the inventive principles, it will be understood that the invention may be embodied otherwise without departing from such principles.

What we claim is:

1. A clutch disc for a motor vehicle friction clutch, comprising:
   a hub (1) which defines a rotational axis (5);
   a torsional oscillation damper (11) having an input part (7, 9), and an output part (19) rotatable around the rotational axis (5) relative to the input part (7, 9) and connected with the hub (1) in torque-transmitting manner, a first one of said parts being provided with a first disc part (19), a second one of said parts being provided with two second discs (7, 9) arranged axially on both sides of the first disc part (19), and being rigidly connected together, and a plurality of springs (23) coupling the input part (7, 9) rotationally elastically with the output part (19), the springs (23) being mounted in windows (25) of the first disc part (19) and engaging in windows (27, 29) of the second disc parts (7, 9);
   a friction device (41, 43, 45) having a friction ring (41) mounted axially between the first (19) and one (7) of the second disc parts (7, 9), said friction ring (41) bearing by means of a friction surface (47) on the first disc part (19) and having, engaging axially into openings (61) of the one (7) of the two second disc parts (7, 9) lugs (39) which drive the friction ring (41) solid in rotation but axially movably on said one (7) of the two second disc parts (7, 9), and having a disc spring (43) tensioning the friction ring (41) axially resiliently against the first disc part (19);
   clutch friction lining (17) held on the input part (7, 9);
   wherein the friction ring (4) and the lugs (39) are formed integrally as a plastic molding; and
   wherein the disc spring (43) has an annularly closed spring body (49) and is mounted axially between said one (7) of the two second disc parts (7, 9) and the friction ring (41), and has, protruding approximately radially from the annularly closed spring body (49) thereof, flexible tongues (51) which with their ends centrally engage the friction ring (41), while the spring body engages (49) with its edge radially facing away from the flexible tongues (51) said one (7) of the two disc parts (7, 9), and wherein each lug (39) of the friction ring (41) extends through a space between a pair of adjacent flexible tongues (51) in peripheral direction.

2. A clutch disc according to claim 1, wherein the number of the flexible tongues (51) is an even-numbered multiple of the number of lugs (39).

3. A clutch disc according to claim 1, wherein the friction ring (41) has an annular body (55) forming the friction surface (47) and the lugs (39) have a smaller radial extension than the annular body (55) and are mounted approximately at the centre of the radial extension of the annular body (55).

4. A clutch disc according to claim 1, wherein the friction ring (41) has an annular body (55) forming the friction surface (47) and having, on its side axially facing away from the friction surface (47), recesses (53) spaced in the peripheral direction into which the flexible tongues (51) engage, each of the recesses having opposite recess edges (59) situated in the peripheral direction and engaging, substantially without play in the peripheral direction, opposite peripheral sides of a respective flexible tongue.

5. A clutch disc according to claim 4, wherein each of the flexible tongues has defining edges and wherein the edges of the recesses (59), at least in the region of the ends of the flexible tongues (51), run parallel to the defining edges (57) of the flexible tongues adjoining them.

6. A clutch disc according to claim 4,
   wherein the recesses (53) are designed as radial grooves extending substantially over the entire radial height of the annular body (55).

7. A clutch disc according to claim 5,
   wherein the defining edges (57) of each individual flexible tongue (51) extends at an acute angle to each other, and the defining edges (57) of two adjacent flexible tongues (51) oppositely situated in the peripheral direction extend parallel to each other.

8. A clutch disc according to claim 1,
wherein the friction ring (41) has, distributed over its inner periphery, several axially protruding resilient clamps (63) which reach into openings (65) of said one (7) of the two second disc parts (7, 9) and by means of an axial stop surface (69) formed on their ends (67) spaced from the friction surface (47) engage from the rear a defining edge (81; 93) of the one of the second disc parts (7) or of a constructional part (75) set into the second disc parts (7).

9. A clutch disc according to claim 8, wherein
the axial distance of the stop surface (69) of the clamp from the friction surface (47) is greater than the axial distance of the defining edge (81; 93) from the friction surface (47).

10. A clutch disc according to claim 8, wherein each clamp (63) has on its end (67) remote from the friction surface (47) and entry chamfer (83) which raises the stop surface (69) of the friction disc (41), during assembly, over the defining edge (81; 93) of the one second disc part or the constructional part.

11. A clutch disc according to claim 8,
wherein the lugs (39) and the clamps (63) are mutually offset in the peripheral direction and wherein the stop surface (69) protrudes radially and the clamp (63) is designed to spring radially.

12. A clutch disc according to claim 8, wherein the clamp (63) is designed to spring radially and the stop surface (69) protrudes radially inwards, and wherein constructional part is a guide ring axially rigidly set into a central opening (73) of said one (7) of the two second disc parts (7, 9), is a guide ring (75) which forms the defining edges (81).

13. A clutch disc according to claim 12, wherein
the guide ring (75) in the region of its outer periphery, has a L-shaped cross-sectional form which is produced by a shell surface (77) engaging into the central opening (73) and a radially protruding flange (71) engaging the inner surface (79) of said one (7) of the two second disc parts (7, 9) and wherein from the flange (71), distributed in the peripheral direction and offset relative to the clamps (63), there protrude axially further clamps (87) springing in the peripheral direction which engage pairwise through the openings (61) of the second disc part (7) associated with the lugs (39) and by means of holding edges (89) mounted on their ends engage said one of the second disc parts (7) from the rear on its external side (91).

14. A clutch disc according to claim 13, wherein
the two further clamps (87) of each pair are separated by a slit (93) and are provided on their ends with entry chamfers (95).

15. A clutch disc according to claim 13,
wherein the axial distance of the holding edge (91) of each further clamp from the flange (71) is equal to the thickness of the one (7) of the two second disc parts (7, 9).

* * * * *